UNITED STATES PATENT OFFICE.

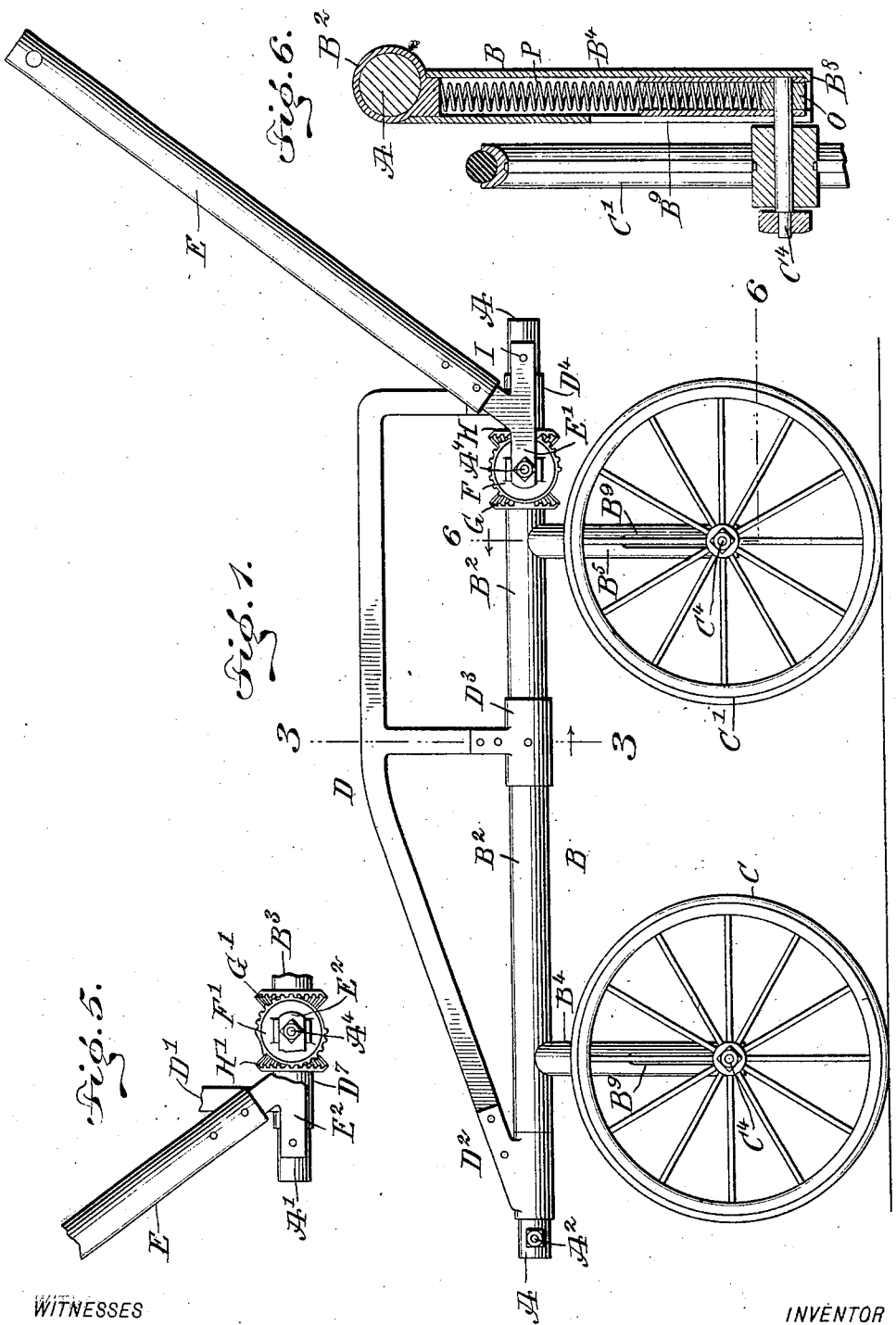

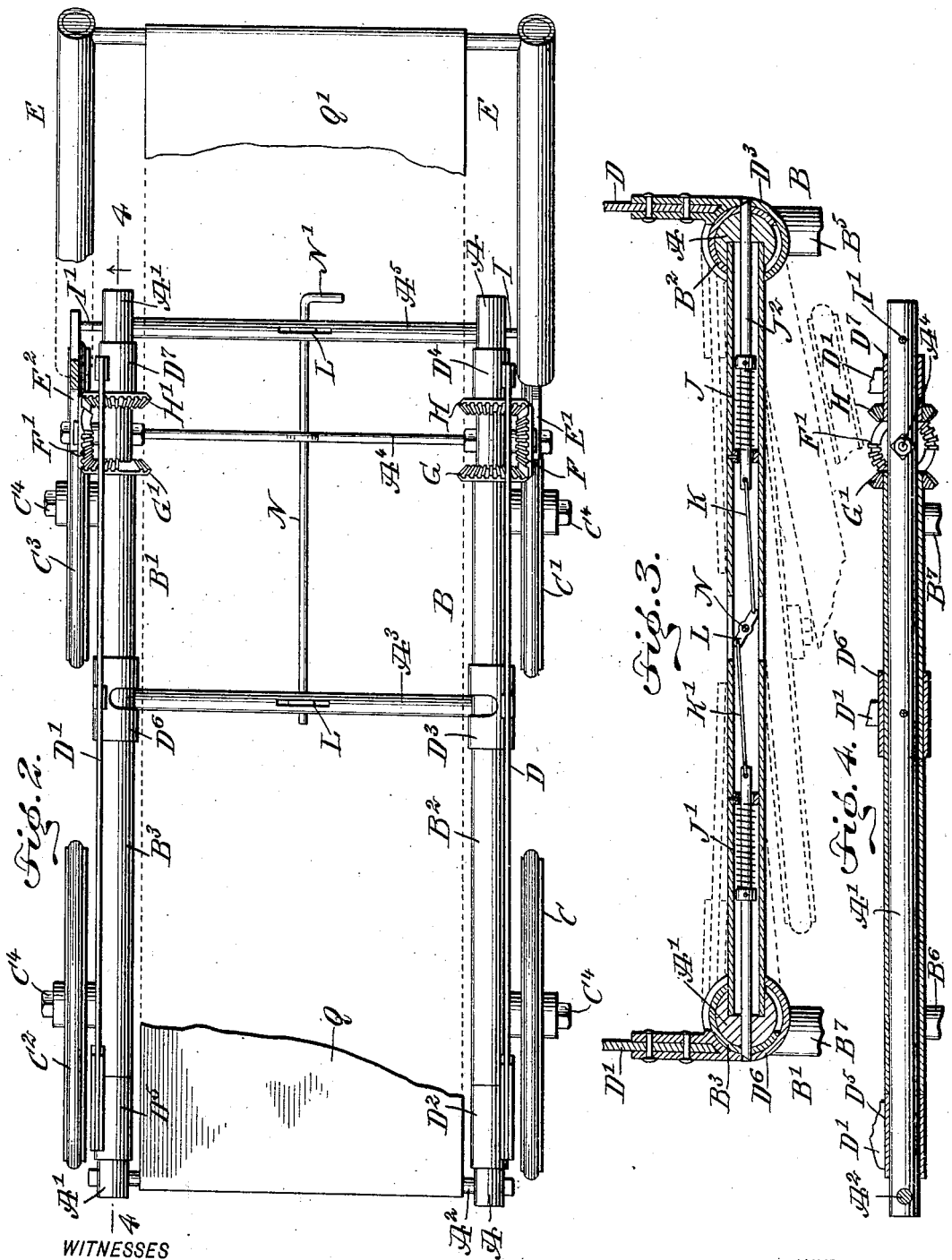

ROBERT J. EHLERS, OF NEW YORK, N. Y., ASSIGNOR OF ONE-HALF TO EMIL GUNDELACH, OF NEW YORK, N. Y.

FOLDING VEHICLE.

No. 863,972.

Specification of Letters Patent.

Patented Aug. 20, 1907.

Application filed October 5, 1906. Serial No. 337,640.

*To all whom it may concern:*

Be it known that I, ROBERT J. EHLERS, a citizen of the United States, and a resident of the city of New York, (borough of Manhattan,) in the county and State of New York, have invented a new and Improved Folding Vehicle, of which the following is a full, clear, and exact description.

The invention relates to baby carriages, go-carts and similar vehicles, and its object is to provide a new and improved folding vehicle, arranged to securely hold the parts in position when extended, and to allow quick changing of the vehicle from an extended to a folding position and vice versa, the vehicle when folded forming an exceedingly compact flat parcel, which can be conveniently carried about or stored in a small space, or packed into a suit case, trunk or the like.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement in an extended position; Fig. 2 is a plan view of the same, parts being in section; Fig. 3 is an enlarged transverse section of the improvement on the line 3—3 of Fig. 1; Fig. 4 is a sectional side elevation of part of the improvement on the line 4—4 of Fig. 2; Fig. 5 is a rear side elevation of the gearing for the right hand side of the vehicle, and Fig. 6 is an enlarged transverse section of the improvement, showing more particularly the mounting of a carriage wheel on the wheel support.

The bed frame of the vehicle consists preferably of the two spaced side bars A, A' connected with each other by cross bars $A^2$, $A^3$, $A^4$, $A^5$, so as to render the bed frame as rigid as possible. The wheel supports B and B' are arranged in such a manner that each carries the front and rear wheel of one side of the vehicle, that is, the wheel support B carries the front and rear wheels C and C' of the left side of the vehicle, while the wheel support B' carries the front and rear wheels $C^2$, $C^3$ of the right hand side of the vehicle. The wheel supports B and B' are provided with longitudinally extending tubular pivots $B^2$, $B^3$ mounted to swing on the side bars A and A', and from the said tubular pivots depend the tubular arms $B^4$, $B^5$, $B^6$, $B^7$, respectively, on which the wheels C, C' and $C^2$, $C^3$ are yieldingly mounted, as hereinafter more fully described. The sides D and D' of the vehicle are adapted to be folded inward onto the top of the vehicle bed, and for this purpose the side D is provided with the tubular pivots $D^2$, $D^3$, $D^4$, of which the pivots $D^2$, $D^4$ are mounted to swing on the side arm A, while the pivot $D^3$ is mounted to swing on the pivot $B^2$ of the wheel support B. The side D' is provided with similar pivots $D^5$, $D^6$ and $D^7$, of which the pivots $D^5$ and $D^7$ are mounted to swing on the side bar A', while the pivot $D^6$ is mounted to swing on the pivot $B^3$ of the wheel support B'.

The handle E has the terminals E', $E^2$ of its side arms mounted to swing on the outer ends of the cross bar $A^4$ of the bed frame, and on the said terminals E', $E^2$ are secured the mutilated bevel gear wheels F and F', of which the mutilated gear wheel F is adapted to mesh with bevel gear wheels G and H, and the mutilated gear wheel F' is adapted to mesh with bevel gear wheels G' and H'. The bevel gear wheels G and G' are secured on the pivots $B^2$ and $B^3$ of the wheel supports B and B', and the bevel gear wheels H and H' are secured on the pivots $D^4$ and $D^7$ of the sides D and D'. When the handle E is in the extended position illustrated in the drawings, then the mutilated gear wheel F is in mesh with the bevel gear wheel H but out of mesh with the bevel gear wheel G, and the mutilated gear wheel F' is in mesh with both bevel gear wheels G' and H'. Now when the handle E is swung forward in a longitudinal direction the mutilated gear wheels F and F' are turned and consequently the bevel gear wheels H, H' and G', to swing the sides D and D' inward and downward onto the top of the bed of the vehicle and at the same time swinging the wheel support D' inward and upward under the bed of the vehicle, and at this time the mutilated bevel gear wheel F meshes with the bevel gear wheel G, so that the wheel support B is caused to swing upward and inward, to fold upon the under side of the other wheel support B' already in a folded position.

From the foregoing it will be seen that the sides D and D' as well as one of the wheel supports swings into a folded position, and then the other wheel support follows, to prevent the wheel supports from interfering one with the other, on moving into a folded position.

The toothless portions of the mutilated gear wheels F, F' and G, G' are convexed and concaved respectively to form Geneva stops, so that during the time the wheel support B swings into a folding position the gear wheel G is held against turning by the convex and concave portions of the bevel gear wheels F and G being in mesh at the time, and after the wheel support B' is folded it is held in this position by the convex and concave portions of the bevel gear wheels F' and G' being in mesh at this time. In a like manner the wheel support B' is first held against movement while the wheel support B swings into an extended position on returning the handle to an extended position; the other wheel support B' following together with the sides D, D'.

It will also be noticed that by the arrangement described the wheel supports, the sides and the handle E are folded to form an exceedingly compact flat parcel, which can be conveniently carried about, stored in a small space or packed into a suit case, trunk or the like, for transportation or other purposes. When the handle E is swung upward and rearward then the wheel support B is first swung downward and outward, after which the other wheel support B′ is swung downward and outward, and at the same time the sides D and D′ are swung upward and outward, to swing the several parts of the vehicle back into an extended position.

In order to lock the several parts in the extended position the following arrangement is made: In the tubular cross bars A⁵ and A³ are mounted to slide transversely the locking bolts I, I′ and I², I³, of which the locking bolts I and I′ engage apertures in the terminals E′, E² of the frame E, so as to lock the same in an extended position. The locking bolts I² and I³ are adapted to pass through apertures in the pivots B², D³ and B³, D⁶ respectively (see Fig. 3), to lock the wheel supports B and B′ as well as the sides D and D′ in extended positions. Each set of bolts I, I′ and I², I³ is held in locking position by the springs J, J′ (see Fig. 3), and the inner ends of the bolts are pivotally connected by links K, K′ with arms L secured on a longitudinally extending shaft N mounted to turn in suitable bearings arranged on the cross bars A³, A⁵ (see Fig. 2). The rear end of this shaft N is provided with a handle N′ which when turned causes simultaneous withdrawal of the two sets of bolts I, I′ and I², I³ to simultaneously unlock the handle E, the wheel supports B and B′ and the sides D, D′, to allow of swinging the handle E into a folded position as above described, thus causing the folding of the wheel supports as well as the sides, as previously explained. When the handle E is swung back into the extended position together with the wheel supports B, B′ and the sides D, D′ then the spring-pressed bolts I, I′ and I², I³ immediately snap into locking position by the action of their springs J, J′, so that the several parts are locked in the extended position without assistance on the part of the operator.

Each of the wheels C, C′, C², C³ is mounted to turn on an axle C⁴ (see Fig. 6) secured on a bearing O mounted to slide in the correspondingly tubular arms B⁴, B⁵, B⁶, B⁷ of the wheel supports B, B′, and the said bearing O is pressed on by a spring P concealed in the corresponding tubular arm. The outer sliding movement of the bearing O in the corresponding tubular arm is prevented by a suitable stop B⁸ arranged on the lower end of the tubular arm. Now when the vehicle is loaded it is evident that the springs P are pressed and consequently the entire vehicle body is spring supported, to insure easy riding of the vehicle. Each shaft C⁴ extends through a vertically disposed slot B⁹ formed in the corresponding tubular arms B⁴, B⁶, B⁷, to hold the wheels in proper alinement. The bottom Q of the vehicle bed may be of any suitable material and supported on the cross bars A², A³, A⁴ and A⁵, and the back Q′ connected with the upper end of the handle E is arranged to allow opening and closing of the handle as previously explained.

The folding vehicle shown and described is very simple in construction and can be readily and conveniently extended or folded by the operator, and it is only necessary to turn the handles N′ and E for unlocking the parts and for folding or extending the same as above mentioned.

Having thus described my invention, I claim as new and desire to secure by Letters Patent:

1. A folding vehicle, comprising a bed, sides pivoted to the bed and capable of folding onto the top thereof, wheel supports each carrying the wheels of one side of the vehicle, the said wheel supports being capable of folding onto the under side of the bed, a handle mounted to swing longitudinally on the said bed, and means for connecting the said handle with the said side wheel supports and with the said sides to fold or extend the same.

2. A folding vehicle, comprising a bed, wheel supports, each carrying the wheels of one side of the vehicle, the said wheel supports being pivoted to the bed to swing transversely thereon, a handle mounted to swing longitudinally on the said bed, and means connecting the said handle with the said wheel supports to swing the latter in succession into a folded or extended position relative to the said bed.

3. A folding vehicle, comprising a bed, wheel supports, each carrying the wheels of one side of the vehicle, the said wheel supports being mounted to swing transversely on the said bed, a handle mounted to swing longitudinally on the said bed, and means connecting the said handle with the said wheel supports to swing the latter successively into a folded or extended position relative to the said bed.

4. A folding vehicle, comprising a bed, wheel supports each carrying the wheels of one side of the vehicle, the said wheel supports being mounted to swing transversely on the said bed, a handle mounted to swing longitudinally on the said bed, means connecting the said handle with the said wheel supports to swing the latter successively into a folded or extended position relative to the said bed, and a manually controlled locking device for locking the said wheel supports and the said handle in an extended position.

5. A folding vehicle, comprising a bed, sides pivoted to the bed and capable of folding onto the top thereon, wheel supports each carrying the wheels of one side of the vehicle, the said wheel supports being capable of folding onto the under side of the bed, a handle mounted to swing longitudinally on the said bed, means for connecting the said handle with the said side wheel supports and with the said sides to fold or extend the same, and manually controlled means on the said bed for simultaneous engagement with the said sides, the wheel supports and the said handle to lock the said several parts in an extended position.

6. A folding vehicle, comprising a bed, sides mounted to swing transversely to fold onto the top of the bed, a handle mounted to swing longitudinally, and means connecting the handle with the said sides to swing the same into a folding or extended position.

7. A folding vehicle, comprising a bed, sides mounted to swing transversely to fold onto the top of the bed, a handle mounted to swing longitudinally, and means connecting the handle with the said sides to swing the same into a folding or extended position on swinging the handle onto a folded or extended position.

8. A folding vehicle, comprising a bed, sides mounted to swing transversely to fold onto the top of the bed, a handle mounted to swing longitudinally, means connecting the handle with the said sides to swing the same into a folding or extended position, and a manually controlled locking device on the said bed for locking the sides and handle in an extended position.

9. A folding vehicle, comprising a bed, sides capable of folding onto the top of the said bed, wheel supports each carrying the wheels of one side of the vehicle, the said wheel supports being capable of folding onto the under side of the bed, a handle mounted to swing longitudinally on the said bed, and means for connecting the said handle with the said side wheel supports and with the said sides to fold or extend the same, the said means first moving one wheel support and the said sides simultaneously into a folded position and then the other wheel support.

10. A folding vehicle comprising a bed having side bars and cross bars rigidly connected with the said side bars, wheel supports each carrying the wheels of one side of the vehicle and mounted to swing transversely on the said side bars, a handle mounted to swing longitudinally on the said bed, and a gearing connecting the said handle with the said wheel supports whereby to swing the supports in succession.

11. A folding vehicle comprising a bed having side bars and cross bars rigidly connected with the said side bars, wheel supports each carrying the wheels of one side of the vehicle and mounted to swing transversely on the said side bars, a handle mounted to swing longitudinally on the said bed, a gearing connecting the said handle with the said wheel supports, the said gearing comprising gear wheels secured on the handle at the pivotal end thereof, and gear wheels on the pivots of the said wheel supports.

12. A folding vehicle comprising a bed having side bars and cross bars rigidly connected with the said side bars, wheel supports each carrying the wheels of one side of the vehicle and mounted to swing transversely on the said side bars, a handle mounted to swing longitudinally on the said bed, a gearing connecting the said handle with the said wheel supports, the said gearing comprising mutilated gear wheels on the pivots of the said wheel supports.

13. A folding vehicle comprising a bed having side bars and cross bars rigidly connected with the said side bars, wheel supports each carrying the wheels of one side of the vehicle and mounted to swing transversely on the said side bars, sides mounted to swing transversely on the pivotal portions of the said wheel supports, a handle mounted to swing longitudinally on the said bed, and a gearing connecting the said handles with the said wheel supports and the said sides.

14. A folding vehicle comprising a bed having side bars and cross bars rigidly connected with the said side bars, wheel supports each carrying the wheels of one side of the vehicle and mounted to swing transversely on the said side bars, sides mounted to swing transversely on the pivotal portions of the said wheel supports, a handle mounted to swing longitudinally on the said bed, a gearing connecting the said handles with the said wheel supports and the said sides, the said gearing comprising gear wheels on the fulcrum end of the said handle, and gear wheels on the wheel support and the said sides.

15. A folding vehicle comprising a bed having side bars and cross bars rigidly connected with the said side bars, wheel supports each carrying the wheels of one side of the vehicle and mounted to swing transversely on the said side bars, sides mounted to swing transversely on the pivotal portions of the said wheel supports, a handle mounted to swing longitudinally on the said bed, a gearing connecting the said handles with the said wheel supports and the said sides, the said gearing comprising mutilated gear wheels on the fulcrum end of the said handle, and gear wheels on the wheel support and the said sides.

16. A folding vehicle comprising a bed having side bars and cross bars rigidly connected with the said side bars, wheel supports each carrying the wheels of one side of the vehicle and mounted to swing transversely on the said bars, a handle mounted to swing longitudinally on the said bed, a gearing connecting the said handle with the said wheel supports whereby to swing the supports in succession, and a manually controlled locking device on the said bed for locking the said handle and the said wheel supports in position.

17. A folding vehicle comprising a bed having side bars and cross bars rigidly connected with the said side bars, wheel supports each carrying the wheels of one side of the vehicle and mounted to swing transversely on the said side bars, sides mounted to swing transversely on the pivotal portions of the said wheel supports, a handle mounted to swing longitudinally on the said bed, a gearing connecting the said handles with the said wheel supports and the said sides, and a manually controlled locking device on the said bed for locking the said handle, the said wheel supports and the said side supports in position.

18. A folding vehicle comprising a bed having side bars and cross bars rigidly connected with the said side bars, wheel supports each carrying the wheels of one side of the vehicle and mounted to swing transversely on the said side bars, a handle mounted to swing longitudinally on the said bed, a gearing connecting the said handle with the said wheel supports, a manually controlled locking device on the said bed for locking the said handle and the said wheel supports in position, the said locking device comprising spring pressed bolts slidable in the cross bars of the said body and adapted to engage the said handle and the said wheel supports, a longitudinal shaft journaled on the said cross bars, and a connection between the said shaft and the said bolts.

19. A folding vehicle comprising a bed having side bars and cross bars rigidly connected with the said side bars, wheel supports each carrying the wheels of one side of the vehicle and mounted to swing transversely on the said side bars, sides mounted to swing transversely on the pivotal portions of the said wheel supports, a handle mounted to swing longitudinally on the said bed, a gearing connecting the said handles with the said wheel supports and the said sides, and a manually controlled locking device on the said bed for locking the said handle, the said wheel supports and the said side supports in position, the said locking device comprising spring-pressed bolts slidable in the said cross bars and adapted to engage the said handle, the said wheel supports and the said sides, a handled shaft extending longitudinally and journaled in the said cross bars, and connections between the said shaft and the said bolts.

20. A vehicle provided with a wheel support having a tubular arm, a wheel, an axle for the wheel to turn on, a bearing carrying the said axle and mounted to slide in the said arm, a spring in the said arm and resting on the said bearing, the said arm having a stop for limiting the outward sliding movement of the said bearing in the said arm.

In testimony whereof I have signed my name to this specification in the presence of two subscribing witnesses.

ROBERT J. EHLERS.

Witnesses:
THEO. G. HOSTER,
EVERARD B. MARSHALL.